(12) United States Patent
Yap (10) Patent No.: US 8,180,183 B1
(45) Date of Patent: May 15, 2012

(54) PARALLEL MODULATOR PHOTONIC LINK

(75) Inventor: Daniel Yap, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 302 days.

(21) Appl. No.: 12/176,089

(22) Filed: Jul. 18, 2008

(51) Int. Cl.
| | |
|---|---|
| G02F 1/01 | (2006.01) |
| G02F 1/035 | (2006.01) |
| H01Q 13/00 | (2006.01) |
| H04B 1/04 | (2006.01) |
| H04B 10/00 | (2006.01) |
| H04B 10/04 | (2006.01) |
| H04B 10/12 | (2006.01) |

(52) U.S. Cl. ............ 385/2; 385/1; 385/3; 398/115; 398/183; 343/772; 455/129

(58) Field of Classification Search ............ 385/1–3; 398/115, 183; 343/772; 455/129
See application file for complete search history.

(56) References Cited

U.S. PATENT DOCUMENTS

| | | | |
|---|---|---|---|
| 3,417,400 A | 12/1968 | Black | |
| 3,735,293 A | 5/1973 | Breitenbach | 333/237 |
| 3,781,725 A | 12/1973 | Yoshida | 333/237 |
| 3,909,757 A | 9/1975 | Miyamoto | 333/237 |
| 4,129,841 A | 12/1978 | Hildebrand | |
| 4,152,648 A | 5/1979 | Delogne | |
| 4,339,733 A | 7/1982 | Smith | |
| 4,376,941 A | 3/1983 | Zenel | 343/709 |
| 4,541,120 A | 9/1985 | Szabo | 455/86 |
| 4,987,394 A | 1/1991 | Harman | |
| 5,076,655 A | 12/1991 | Bridges | |
| 5,247,270 A | 9/1993 | Harman | 333/237 |
| 5,291,565 A | 3/1994 | Schaffner et al. | |
| 5,517,199 A * | 5/1996 | DiMattei | 342/357.31 |
| 5,703,706 A * | 12/1997 | Eckstein et al. | 398/80 |
| 5,936,203 A | 8/1999 | Ryman | |
| 5,936,589 A | 8/1999 | Kawahata | 343/785 |
| 5,940,196 A | 8/1999 | Piehler | 398/91 |
| 5,963,567 A | 10/1999 | Veselka | 372/21 |
| 6,246,500 B1 | 6/2001 | Ackerman | 398/115 |
| 6,418,248 B1 * | 7/2002 | Hayes | 385/24 |
| 6,522,793 B1 * | 2/2003 | Szilagyi et al. | 385/2 |
| 6,525,692 B2 | 2/2003 | Kim | 343/702 |
| 6,703,596 B1 | 3/2004 | Moran | |
| 6,724,523 B2 | 4/2004 | Yap | |
| 6,996,345 B1 | 2/2006 | Chen | 398/183 |
| 7,133,576 B2 | 11/2006 | Coldren | 385/1 |

(Continued)

OTHER PUBLICATIONS

Betts, G.E., et al.,"High-Sensitivity Bandpass RF Modulator in LiNb03," SPIE Integrated Optical Circuit Engineering VI, vol. 993, pp. 110-116 (1988).

(Continued)

Primary Examiner — Ryan Lepisto
Assistant Examiner — Jerry Blevins
(74) Attorney, Agent, or Firm — Ladas & Parry (57) ABSTRACT

An RF photonic link having at least one light source, at least one photodetector, multiple optoelectronic modulators, and an RF waveguide common to each one of said multiple optoelectronic modulators. The multiple optoelectronic modulators are optically arranged in parallel to receive light from said at least one light source and are disposed in said RF waveguide. The RF waveguide, in use, guides an RF electromagnetic field applied to each of the multiple optoelectronic modulators disposed therein, the RF electromagnetic field propagating through the RF waveguide in a direction that is perpendicular to a direction in which an optical field propagates through each of said optoelectronic modulators.

27 Claims, 7 Drawing Sheets

U.S. PATENT DOCUMENTS

| | | | |
|---|---|---|---|
| 7,260,280 B2 | 8/2007 | Ichioka et al. | |
| 7,369,722 B2* | 5/2008 | Yilmaz et al. | 385/27 |
| 7,471,258 B2 | 12/2008 | Hsu | 343/895 |
| 7,486,247 B2 | 2/2009 | Ridgway | 343/767 |
| 7,558,488 B2 | 7/2009 | Matsui | 398/201 |
| 7,657,132 B1 | 2/2010 | Yap | 385/10 |
| 7,660,491 B2 | 2/2010 | Thaniyavarn | 385/3 |
| 7,738,794 B2 | 6/2010 | Akiyama | 398/182 |
| 7,835,600 B1 | 11/2010 | Yap | 385/12 |
| 2002/0105378 A1* | 8/2002 | Tapio | 330/10 |
| 2004/0067006 A1* | 4/2004 | Welch et al. | 385/14 |
| 2004/0179825 A1 | 9/2004 | Im | 386/111 |
| 2006/0270368 A1 | 11/2006 | Caimi | 455/129 |
| 2008/0069491 A1 | 3/2008 | Kissa | 385/2 |
| 2009/0051614 A1 | 2/2009 | Wong | 343/803 |

OTHER PUBLICATIONS

Bridges and Schaffner, IEEE Transactions on Microwave Theory and Techniques, vol. 43, No. 9, pp. 2184-2197 (Sep. 1995).

Cho, et al., IEEEE Journal of Quantum Electronics, vol. QE-13, No. 4, pp. 206-208 (Apr. 1977).

Cohn, S.B., et al.,"Optimum Design of Stepped Transmission-line Transformers," IRE Trans. Microwave Theory Tech., vol. 3, No. 3, pp. 16-20 (Apr. 1955).

Cutolo, et al., Applied Physics Letters, vol. 71, No. 2, pp. 199-201 (Jul. 14, 1997).

Emerson and Cumming Microwave Products, Eccostock HiK500F data sheet, www.eccosorb.com, rev. May 11, 2007.

Farwell, et al., IEEE Photonics Technology Letters, vol. 5, No. 7, pp. 779-782 (Jul. 1993).

Ghatak, A.K., et al., "Optical Electronics," pp. 441-447, Cambridge University Press, 1989.

Hsu, R.C., et al., "All-dielectric photonic-assisted radio front-end technology," Nature Photonics, vol., pp. 535-538 (Sep. 2007).

Johnson, et al., IEEE Photonics Techn. Letters, vol. 2, No. 11, pp. 810-811 (Nov. 1990).

Khurgin, et al., Optical Letters, vol. 25, pp. 70-72 (2000).

Kim, et al., Electronics Letters, vol. 41, No. 18 (Sep. 1, 2005).

Lee, R.T., et al.,"A design study for the basic TEM horn antenna," IEEE Antennas and Propagation Magazine, vol. 46, No. 1, pp. 86-92 (Feb. 2004).

1b.LINX Technologies RXM-900-HP-II RF Module specification-www.linxtechnologies.com.

1c. MAXIM, Receiver Sensitivity Equation for Spread Spectrum Systems, MAXIM application note 1140, Jun. 28, 2002 www.maxim-ic.com/an1140.

Morito, K., et al., "A Broad-Band MQW Semiconductor Optical Amplifier with High Saturation Output power and Low Noise Figure," IEEE Photon. Technol. Lett. vol. 17, No. 5, pp. 974-976 (May 2005).

NAVSYNC CW20 GPS receiver specification—www.naysync.com.

Ruze. J., "Wide-Angle Metal Plate Optics," Proceedings of the I.R. E., vol. 38, No. 1, pp. 53-59 (Jan. 1950).

Shaw, et al., Electronics Letters, vol. 35, No. 18, pp. 1557-1558 (Sep. 2, 1999).

Shi, W., et al., "Demonstration of Dual-Depletion-Region Electroabsorption modulator at 155 Wavelength for High Speed and Low Driving Voltage Performance," IEEE Photon. Technol. Lett., vol., 17, No. 10, pp. 2068-2070 (Oct. 2005).

Sun, et al., Electronic Letters, vol. 31, No. 11, pp. 902-903 (May 1995).

Taylor, Journal of Lightwave Technology, vol. 17, No. 10, pp. 1875-1883 (Oct. 1999).

Welstand, et al., IEEE Photonics Technology Letters, vol. 7, No. 7, pp. 751-753 (Jul. 1995).

Wood, L., "Opening Statement before the United States Senate committee on the Judiciary, Subcommittee on Terrorism," Mar. 8, 2005.

Adams, R.C., et al., "COMWIN Antenna System Fiscal Year 200 Report," SPAWAR, Technical Report 1836, (Sep. 2000).

Cohn, S.B., "Optimum Design of Stepped Transmission Line Transformers," IRE Trans. Microwave Theory Tech., vol. MTT-3, pp. 16-21 (Apr. 1955).

Kumar, G., et al., "Broadband Microstrip Antennas," Table 2, p. 43, Artech House (2003).

Suzuki, T., et al., "Design of a tunnel relay system with a leaky coaxial cable in an 800MHz band land mobile telephone system," Vehicular Technology, IEEE Transactions on, vol. 29, No. 3, pp. 305-316 (Aug. 1980).

Thomas, R.W., et al., "Radiax™, a new radiating coaxial cable," Vehicular Technology Conference, 22nd IEEE, vol. 22, pp. 430-439, (Dec. 7-8, 1971).

Wait, J.R., "Electromagnetic Theory of the Loosely Braided Coaxial Cable: Part 1," IEEE Transactions on Microwave Theory and Techniques, vol. MIT-24, No. 9 (Sep. 1976).

U.S. Appl. No. 12/193,500, filed Aug. 18, 2008, Schaffner.
U.S. Appl. No. 12/252,189, filed Oct. 15, 2008, Hsu.
U.S. Appl. No. 12/176,114, filed Jul. 18, 2008, Yap.
U.S. Appl. No. 12/141,834, filed Jun. 18, 2008, Yap.

* cited by examiner

PARALLEL MODULATOR PHOTONIC LINK

CROSS REFERENCE TO RELATED APPLICATIONS

This application is related to the following US patent applications: U.S. Ser. No. 12/141,825, filed on Jun. 18, 2008 and entitled "Optoelectronic modulator and electric-field sensor with multiple optical-waveguide gratings"; U.S. Ser. No. 12/141,834, filed on Jun. 18, 2008 and entitled "Enhanced Linearity RF Photonic Link"; U.S. Ser. No. 12/176,071, filed on the same date as this application and entitled "Microwave receiver front end assembly and array"; and U.S. Ser. No. 12/176,114, filed on the same date as this application and entitled "An RF Receiver Front-End Assembly". The disclosures of each of these related applications is hereby incorporated herein by reference.

TECHNICAL FIELD

This disclosure relates to an RF photonic link that includes multiple optoelectronic modulators, one RF waveguide that contains those multiple optoelectronic modulators, at least one light source, at least one photodetector, and multiple optical waveguides or optical fibers that interconnect the light sources, the photodetectors and the optoelectronic modulators. The multiple optoelectronic modulators are optically arranged in parallel, but a common (i.e. the same) RF waveguide or RF electrode structure supplies an electric field for modulating the light that passes through these multiple modulators. Instead of having the RF signal divided among multiple RF waveguides or RF signal paths, a single RF path feeds these multiple modulators, which are electrically connected in series. Thus, the full RF signal propagating through that one RF waveguide is supplied to each of the optoelectronic modulators. In general, the RF signal comprises frequency components greater than 100 MHz and the RF waveguide or electrode structure can conduct electromagnetic (EM) fields of that frequency range through it with low attenuation.

BACKGROUND

Most prior art RF photonic links comprise a single laser, a single modulator and a single photodetector. In such prior art RF photonic links, a way to increase the signal-to-noise ratio (SNR) is to increase the laser power that is delivered to the modulator. The increase in SNR is proportional to the increase in laser power so long as the noise of the link is dominated by the shot noise processes in the photodetector. However, when the laser power becomes sufficiently high, the noise becomes dominated by the intensity noise of the laser. In that case, additional increases in the laser power do not result in further improvement in the SNR. There is a need to further increase the SNR. The present invention accomplishes this by using multiple modulators and combining their modulated outputs. The use of RF photonic links that comprise multiple sets of laser, modulator and photodetector was not as beneficial in the past because the input RF signal would need to be divided among those multiple modulators. Thus, the depth-of-modulation achieved in each of those sets would be reduced accordingly, and the photodetector output signal of each set also would be reduced. In contrast, the present invention applies the same RF input to the multiple modulators, without needing to divide that RF power. Since the depth-of-modulation for each set is not compromised, a combination of the modulated light from those multiple sets can yield higher photodetected output signal.

The circuits of this disclosure achieve greater signal-to-noise ratio (SNR) compared to an RF photonic link that contains only a single modulator. For an RF photonic link according to this disclosure that has one photodetector and multiple lasers of differing wavelengths, the improvement in the photodetected signal power is proportional to N, the number of modulators (and the number of lasers), assuming each laser emits light of the same power. The DC component of the light delivered to the photodetector also is proportional to N. In that case, the link preferably is operated at a laser power wherein the laser intensity noise dominates the photodetector shot noise. The intensity noise contributions from different lasers are uncorrelated. The noise power increases as the square root of N. Thus the improvement in SNR, compared to the SNR of an RF photonic link having a single modulator is proportional to the square root of the number of modulators in the multiple-modulator RF photonic link.

For a link with multiple photodetectors whose RF outputs are coupled together using phase-sensitive couplers or at a current-summing node, again the improvement in the photodetected signal power is proportional to N, the number of modulators (and the number of lasers), assuming each laser emits light of the same power. For such an RF photonic link, the shot noise contributions from the multiple photodetectors are uncorrelated. Thus, this RF photonic link can be operated at a laser power wherein the photodetector shot noise dominates the laser intensity noise. In that case, the link can have a single laser supply the light to the multiple modulators.

However, if the link is to be operated at a laser power wherein the laser intensity noise is dominant, that link should preferably have multiple lasers as well as multiple photodetectors, so that the dominant noise contributions will be uncorrelated. The improvement in SNR again can be a great as the square root of the number of modulators.

There are a number of military and commercial applications of RF photonic links. These applications include fiber radio in which signals for wireless RF networks (such as cell phone networks) are transported to/from the base stations through optical fiber. These signals have limited bandwidth but are at high carrier frequency, with the carrier frequency ranging from 1 to 60 GHz. The bandwidth of these signals is generally less than 5-10% of the carrier frequency. The signal bandwidth for defense applications can be even larger. The enhanced modulation depth of this invention is well suited both to these commercial applications and to defense applications. The integrated RF waveguide and modulators of this invention can be coupled directly to an RF antenna or some other EM field concentrating structure.

Figure 1:
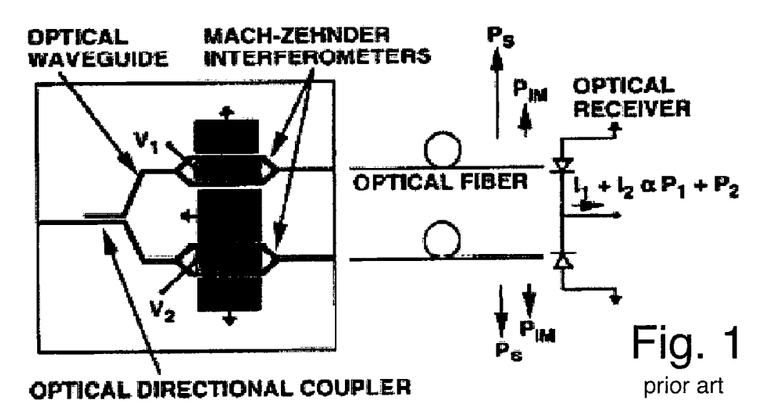
FIG. 1 illustrates two optoelectronic modulators arranged in parallel that are driven by separate RF electrodes (prior art).

An exemplary prior art modulating device having two parallel modulators is described in an article by Bridges and Schaffner (*IEEE Transactions on Microwave Theory and Techniques*, vol. 43, no. 9, September 1995, pp. 2184-2197) and shown in FIG. 1 herein. Two modulators are optically arranged in parallel, with the light supplied to them split by means of an optical directional coupler into two paths. One of those paths goes to the first modulator and the other of those paths goes into the second modulator. The RF electric fields for modulating the refractive index in these two modulators are provided by two different coplanar-waveguide RF transmission lines, which share only a common ground electrode. These two transmission lines have separate signal electrodes, with one signal electrode being associated with the first modulator and a second signal electrode being associated with the second modulator. With this prior art device, an input RF signal must be divided or split into two paths with one path directed to the first signal electrode and the other path directed to the second signal electrode. Thus, the input RF power is divided among these two paths so the power driving each of the two modulators is reduced. In contrast to this prior art, the present invention does not divide the input RF power but rather supplies the entire input RF power to each of its multiple modulators.

Figure 2:
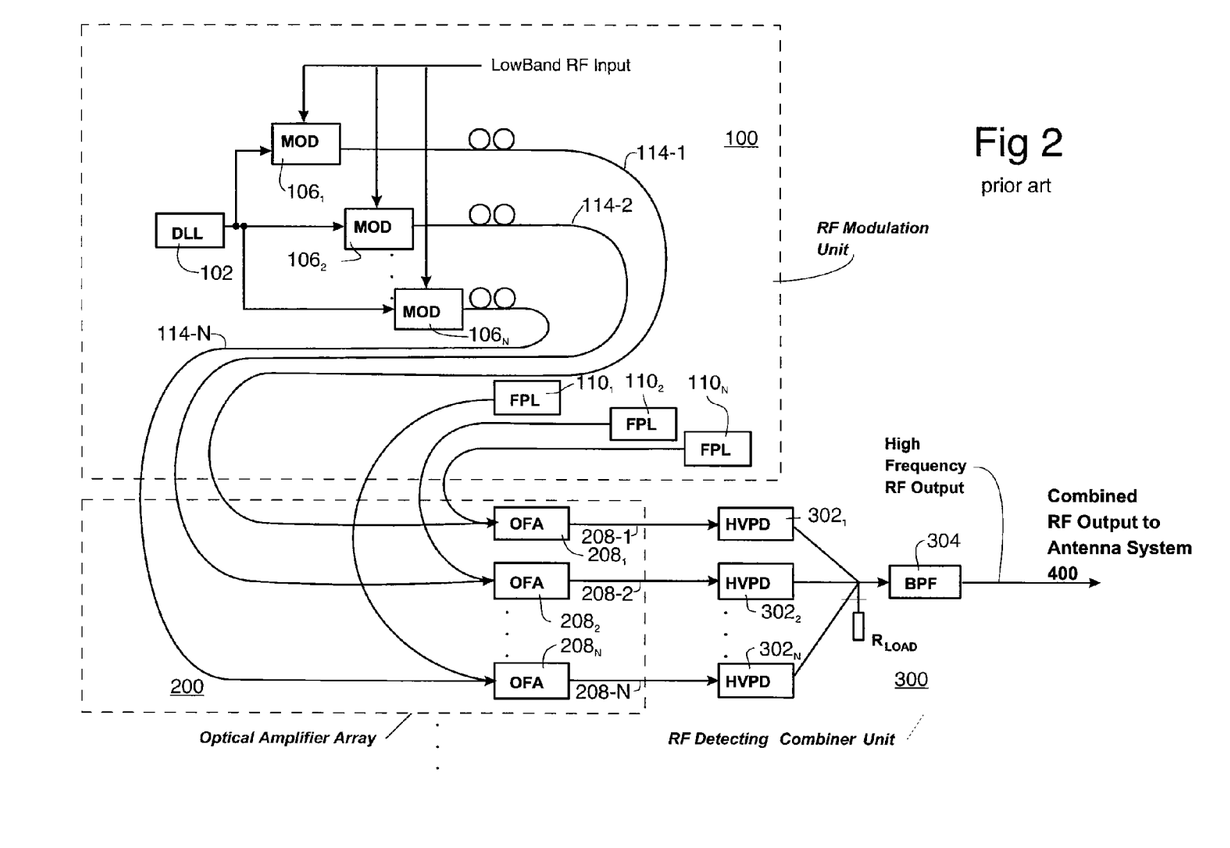
FIG. 2 illustrates a prior art RF photonic link comprising parallel optical and electrical connections of multiple optoelectronic modulators.

A prior art RF photonic link that comprises a parallel connection of multiple optical modulators is described in U.S. Pat. No. 6,724,523, whose inventor, D. Yap, is the inventor of the present application. U.S. Pat. No. 6,724,523 is hereby incorporated herein by reference. This prior art RF photonic link is illustrated in FIG. 2 herein. Light from one laser 102 is divided into multiple optical paths and thereby supplied to multiple optical modulators 106. Also, the RF drive signal is divided into multiple electrical paths and thereby supplied to those multiple optical modulators. The modulated light is supplied to multiple photodetectors 302 whose electrical output currents are combined together into a common load-impedance RLOAD. Some embodiments of the present invention use the same approach as used in this prior art photonic link for combining the electrical outputs of multiple photodetectors. However, unlike this prior art, the present invention does not divide the input RF power but rather supplies the entire input RF power to each of the multiple modulators.

Figure 3:
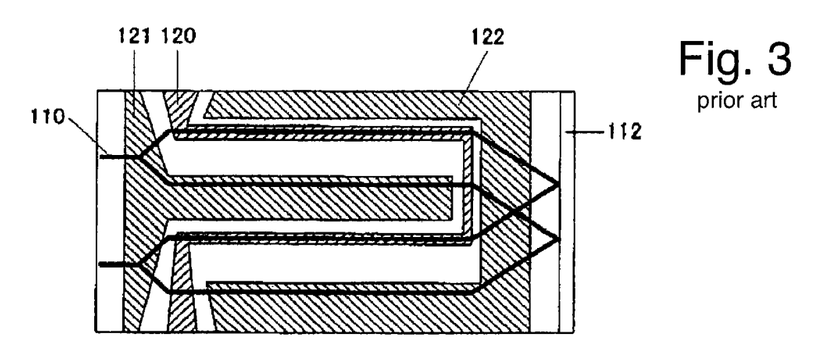
FIG. 3 illustrates a prior art modulator comprising series connection of RF electrode sections and series connection of optical modulator portions.

A prior art optical modulator that contains an RF electrode structure wherein the RF field feeds multiple modulating sections in a series or cascaded manner is described in U.S. Pat. No. 7,260,280. In this device (illustrated in FIG. 3) the light to be modulated propagates in the same direction as does the RF field propagating in the electrode structure. Also, the multiple portions of optical modulator that are driven by the series connection of electrodes are themselves optically arranged in series. In contrast, the present invention connects the multiple distinct optical modulators in parallel.

In these prior art photonic links, the RF field propagating in the electrodes of the modulators travels in the same direction as the optical field propagating through those modulators (with that optical field being modulated because of the presence of the RF field). A novel feature of the present invention is that the RF field propagating in its RF waveguide travels in a direction that is perpendicular to the direction in which the optical field propagates through the modulators. This perpendicular relationship allows the propagating RF field to traverse multiple optoelectronic modulators sequentially. Although the RF waveguide provides a "traveling-wave" electrode, the drive electrode for each optoelectronic modulator is in essence a "bulk" electrode (i.e., the RF drive signal for the entire length of that optoelectronic modulator arrives at the same instant in time). This dual use of an RF waveguide as both a traveling-wave structure for the RF field and as a bulk electrode for the modulator, with the bulk electrode not being a termination of the traveling-wave structure, also is different from prior art, which typically places the bulk electrode at the termination of an RF cable.

BRIEF DESCRIPTION OF THE INVENTION

This disclosure relates to an RF photonic link that includes multiple optoelectronic modulators, one RF waveguide that contains those multiple optoelectronic modulators, at least one light source, at least one photodetector, and multiple optical waveguides or optical fibers that interconnect the light sources, the photodetectors and the optoelectronic modulators. The multiple modulators are optically arranged in parallel but a common (i.e. the same) RF waveguide, or RF electrode structure, supplies the electric field for producing the modulation of the light that passes through these multiple modulators. Instead of having the RF signal divided among multiple RF waveguides or RF signal paths, a single RF path feeds these multiple modulators, which are electrically connected in series. Thus, the full RF signal propagating through that one RF waveguide is supplied to all of the modulators. In general, the RF signal comprises frequency components greater than 100 MHz and the RF waveguide or electrode structure preferably can conduct EM fields of that frequency range through it with low attenuation.

The modulators preferably are based on optical guided-wave (e.g., optical waveguiding) structures. In some embodiments, the modulators are optical-waveguide gratings formed in an electro-optic material, with the electric field controlling the intensity of the light that is transmitted through or reflected from the gratings. In other embodiments, the modulator is a semiconductor electro-absorption modulator wherein the absorption edge is shifted by an applied electric field. In yet other embodiments, the modulator has a Fabry Perot optical cavity containing an electro-optic material whose refractive index can be modulated by the RF electric field, thereby changing the optical transmission and reflection through that cavity for a given wavelength of the light. In all of these embodiments, the direction in which the light propagates through the modulator is perpendicular to the direction in which the RF field propagates through the RF waveguide that contains those modulators.

In some embodiments, the RF photonic link comprises multiple light sources with each light source producing light of a different optical wavelength. Each one of the multiple modulators modulates the light of a different wavelength. In other embodiments, the RF photonic link has multiple photodetectors and at least one light source. Each one of the multiple modulators supplies modulated light to a different photodetector. The electrical outputs of the multiple photodetectors can be combined together directly by supplying the RF signals output from the multiple photodetectors to the inputs of phase-sensitive RF couplers or by combining the output currents of the multiple photodetectors at a current-summing node of an operational amplifier.

The electrode structure preferably is an RF waveguide such as a transverse electromagnetic (TEM) waveguide or a dielectric waveguide. The RF waveguide preferably is filled, at least in part, with an electro-optic (EO) material, with an electro-refractive (ER) material or with an electro-absorbing (EA) material. The EM field propagating through the RF waveguide produces a time-varying modulation of the optical refractive index of the EO or ER material (or the optical absorption of the EA material) at the various points in the RF waveguide that have the ER, EO or EA material. The amount of modulation depends on the local strength of the electric field component, the RF signal, of that propagating EM field. Different ones of the multiple optical modulators are located at different points on the RF waveguide such that each of the multiple modulators sees the RF signal with a different time delay as the EM field propagates through the RF waveguide. In some embodiments the locations of these modulators are selected such that the time delay is approximately a multiple of the time period of the primary (or central) frequency component of the time-varying RF signal. In other embodiments the locations of these modulators are selected such that the time delay is approximately a specific fraction of the time period of the primary frequency component of the time-varying RF signal. In yet other embodiments, the length of the optical waveguide (or optical fiber) connecting to each of the modulators is adjusted to time delay the modulated light reaching the photodetector from each of the modulators such that they all correspond to modulation produced by the same temporal portion of the RF signal supplied to the RF waveguide.

In one aspect the present invention provides an RF photonic link having at least one light source, at least one photodetector, multiple optoelectronic modulators, and an RF waveguide common to each one of said multiple optoelectronic modulators. The multiple optoelectronic modulators are optically arranged in parallel to receive light from the at least one light source and are disposed in the RF waveguide. The RF waveguide, in use, guides an RF electromagnetic field successively to each of the multiple optoelectronic modulators disposed therein, the RF electromagnetic field propagates through the RF waveguide in a direction that is perpendicular to a direction in which an optical field propagates through each of said optoelectronic modulators.

In another aspect the present invention provides a method of forming an RF photonic link including: providing at least one light source, providing at least one photodetector, providing multiple optoelectronic modulators, and providing an RF waveguide common to each one of the multiple optoelectronic modulators. The multiple optoelectronic modulators are disposed in the RF waveguide such that optical axes of the multiple optoelectronic modulators are arranged in parallel to receive light from said at least one light source; and the RF waveguide, in use, supplies an RF electromagnetic field to each of the multiple optoelectronic modulators disposed therein, the RF electromagnetic field propagates through the RF waveguide in a direction that is perpendicular to a direction in which an optical field propagates through each of said multiple optoelectronic modulators.

DETAILED DESCRIPTION

Figure 4A:
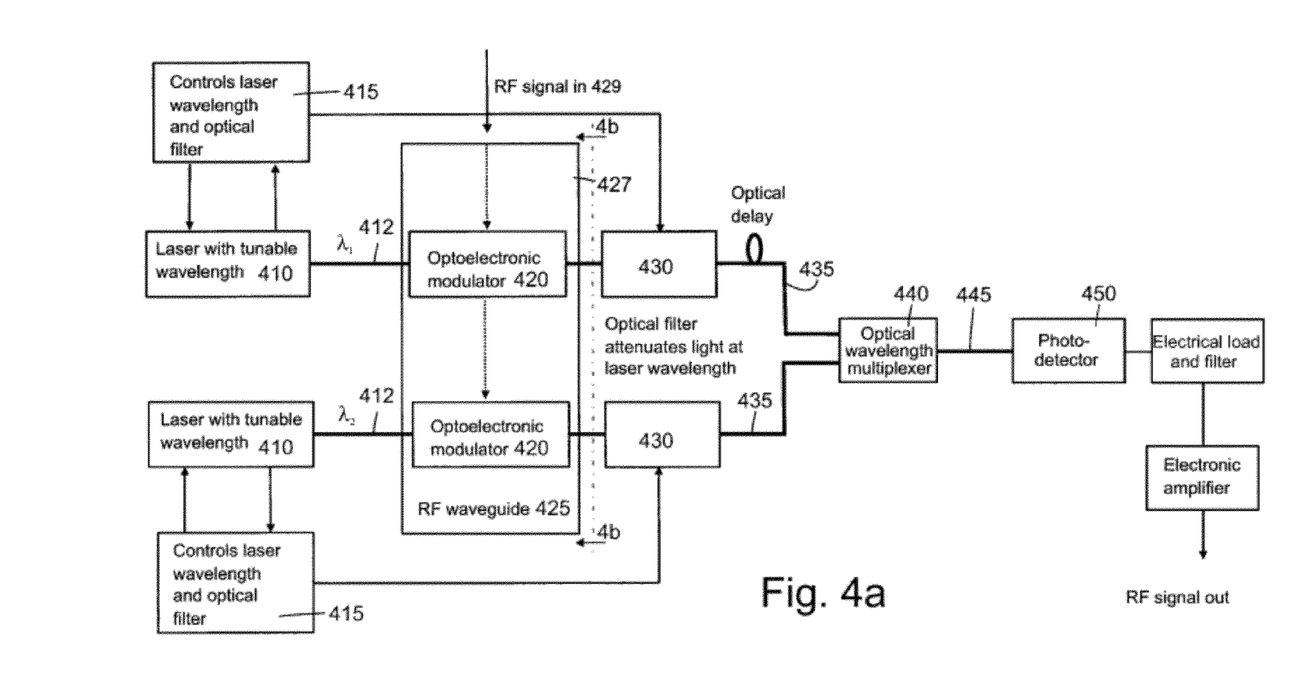
FIG. 4*a* is a block diagram of RF photonic link comprising multiple laser sources and multiple optoelectronic modulators and a single photodetector in accordance with the present invention.

FIG. 4*a* illustrates an RF photonic link of this invention that comprises multiple light sources 410, multiple optoelectronic modulators 420 and a single photodetector 450. The light sources preferably are lasers 410 whose emitting wavelength can be controlled. Only two lasers are depicted in FIG. 4, but it is to be understood that many lasers 410 may be utilized and their light subjected to a common RF field preferably in a common RF waveguide 425. Different ones of these light sources 410 emit light at outputs 412 of a different optical wavelength (e.g., $\lambda_1$ and $\lambda_2$ for the two lasers depicted by FIG. 4*a*). Each light source 410 is associated with a different one of the multiple optoelectronic modulators 420 and blocks 415 provide the control currents or voltages needed to fix the carrier frequency (by adjusting the drive current) of each laser 410 and the associated filtering characteristics (by adjusting a control voltage) of the associated filter 430.

Figure 4B:
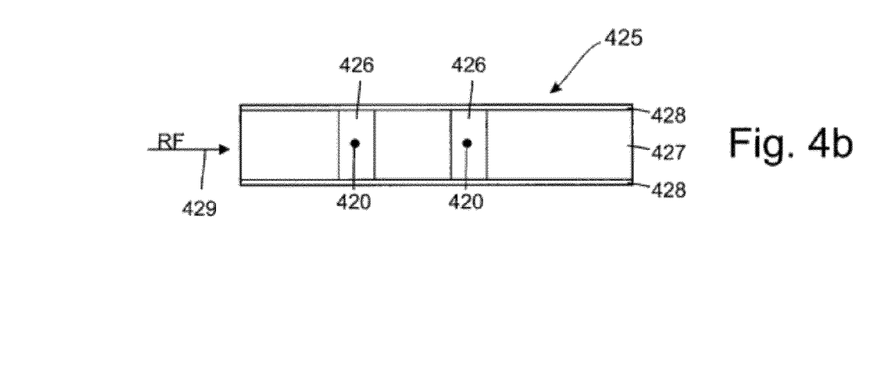
FIG. 4*b* is a side elevational view of the RF waveguide depicted as a block in FIG. 4*a*.

While FIG. 4*a* is a block diagram, the RF waveguide 425 is preferably a six-sided elongated rectangular structure having slices disposed therein, with optoelectronic modulators 420 formed in the slices. FIG. 4*b* is a schematic diagram of a side elevational view of the RF waveguide 425. The optoelectronic modulators 420 each have an optical waveguide 426 which is representionally depicted by a black dot in FIG. 4*b*. One end of the waveguide 426 in each optoelectronic modulator 420 receives light from an associated laser 410 while the other end of the waveguide supplies modulated light to an optional associated optical filter 430.

The modulated light from at least two of these light source and modulator combinations is supplied to a common (i.e. the same) photodetector 450. An optical wavelength multiplexer 440 can be used to combine the light from multiple modulators 420 into a common optical output path 445. Alternatively, the light from multiple modulators 420 can be directed by means of mirrors and other free-space (in contrast to guided wave) optical components to illuminate the same photodetector 450.

The photodetector 450 receives modulated light originating from multiple light sources 410, such as the lasers shown in FIG. 4*a*. Typically, the depth of modulation (the relative amount of laser power in the modulation sidebands compared to the relative amount of laser power at the original laser "carrier" wavelength) is small to minimize non-linear distortions. Thus, the total optical power that illuminates a photodetector 450 can be very high when the light from multiple laser sources are combined onto that same photodetector 450. However, much of this optical power does not represent useful RF signal information but rather is just a DC (constant in time) component. To limit the total optical power that illuminates photodetector 450, the optical outputs from each of the multiple modulators 420 preferably are filtered by an optional optical filter 430 that attenuates the light at the "carrier" wavelength (e.g., $\lambda_1$ or $\lambda_2$ for the two lasers depicted by FIG. 4) of the laser associated with a particular modulator 420. This reduction of the optical power at the "carrier" wavelengths ensures that the noise of the RF photonic link is dominated by the laser intensity noise rather than by the shot noise in the photodetecting process The plurality of optoelectronic modulators 420 are located within a common RF waveguide 425, as illustrated in FIGS. 4*a* and 4*b*. This RF waveguide 425 can be a dielectric-filled transverse electromagnetic (TEM) waveguide that has a pair of metal plate electrodes 428 that sandwich a dielectric material 427. The RF waveguide 425 also can have other forms, such as a dielectric waveguide (with no metal electrodes) or a micro-strip RF transmission line. The RF waveguide 425 is preferably designed to conduct through it, with low attenuation, a specific frequency range of the propagating electromagnetic (EM) field. The actual structure of the RF waveguide 425 may resemble a slab that has six sides (see FIG. 5*b*). All of the preferred RF waveguides have a structure with at least a pair of opposite sides that are not covered by any metal of the electrodes. These un-covered sides are available for optical access. Another two opposite sides are the input and the output ends of the RF waveguide. The remaining two sides can be covered with the metal electrodes 428. For a TEM waveguide, the metal covered sides are typically the widest ones of the slab structure. These two sides are almost entirely covered with the metal electrodes 428.

The filter and amplifier shown downstream of the photo-detector 450 are standard circuit components found downstream of a photodetector and therefore they are not discussed further herein as those skilled in the art should be already familiar with them.

Figure 5A:
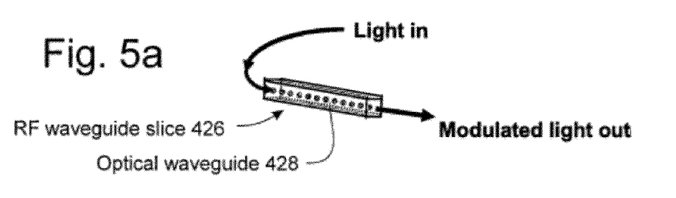
FIGS. 5*a* and 5*b* illustrate an RF waveguide having multiple optoelectronic modulators.
Figure 5B:
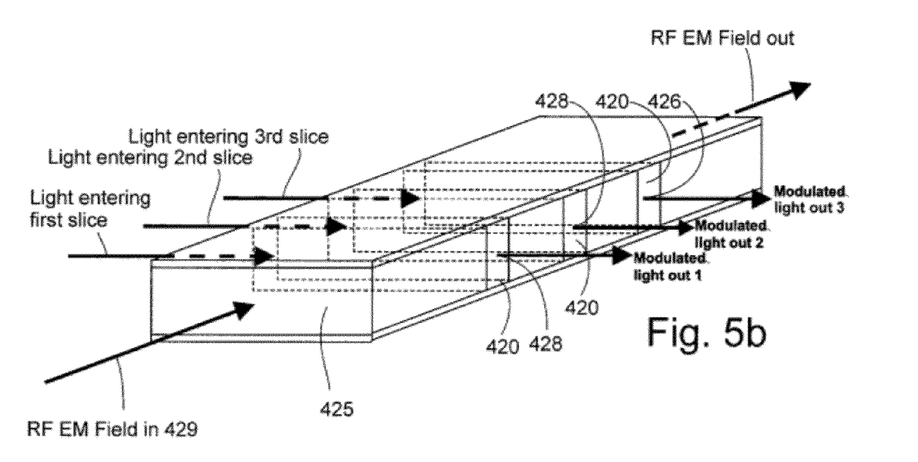

FIG. 5*b* illustrates a dielectric-filled TEM RF waveguide 425 and FIG. 5*a* depicts one of the optoelectronic modulators 420 deployed in slice 426 within waveguide 425. A pair of parallel-plate electrodes 428 is formed on the top and bottom sides of the RF waveguide structure 425. The EM field 429 propagates in that RF waveguide structure 425 from left to right. The optoelectronic modulators 420 are located within slices 426 of the RF waveguide structure 425 (as shown in FIGS. 5*a* and 5*b*). Each 426 slice lies in a cross-section through the longitudinal axis of the RF waveguide 425 (i.e., the direction in which the EM field propagates through that RF waveguide). FIG. 5*b* shows three optoelectronic modulators 420, with each modulator located in a different one of three slices 426 (each slice 426 is represented by dashed lines in FIG. 5*b*), but many more optoelectronic modulators 420 and arranged in associated respective slices 426 may be utilized in a common waveguide 425, if desired. The lateral sides of the TEM RF waveguide 425 are exposed dielectric faces. Light is coupled to/from the optoelectronic modulators through these lateral sides, as illustrated in these figures. Each optoelectronic modulator 420 comprises an optical waveguide 423 of electro-optic material, electro-refractive material or electro-absorbing material. The portion of the RF waveguide's metal electrodes 428 that is in a given slice 426 comprises the electrodes for the optoelectronic modulator of that slice. The EM field propagating in the RF waveguide produces an electric field across the metal electrode portions at a slice. This applied electric field changes the optical refractive index of the electro-optic material in the slices 426 because of the electro-optic (Kerr) effect in that material. It also shifts the absorption spectrum of the electro-absorbing material (typically because of the Franz-Keldysh effect or the Stark effect), resulting in a change in the absorption of the laser light propagating in that modulator 420. In an electro-refractive material, this shift in the absorption spectrum results in a change in the optical refractive index at the wavelength of the laser light.

The optical waveguides 423 of an optoelectronic modulator 420 preferably are buried waveguides and they can be fabricated by known techniques. For example, an optical waveguide in lithium niobate electro-optic material can be formed by diffusing a strip of titanium into a lithium niobate substrate and then by covering the surface of the lithium niobate substrate with a dielectric material having an optical refractive index similar to or lower than that of lithium niobate or else with another piece of lithium niobate. For another example, an optical waveguide in a semiconductor can be formed by growing (or depositing) an epitaxial layer of GaInAsP onto an InP substrate. A strip of the GaInAsP is then defined by etching that GaInAsP layer. Next, that GaInAsP strip (the waveguide core) can be buried by epitaxially depositing another layer of InP over it. A known method such as metal-organic chemical vapor deposition can be used for the epitaxial material growth. The top surface of the InP layer is then polished flat. The metal electrodes can be formed by means such as electroplating or sputter deposition or deposition from an evaporating metal source. For a parallel plate electrode configuration, the electric field is fairly uniform in the region between the two plates. Thus, the main constraint on the location of the optical waveguide is that the optical mode of the waveguide be far enough away from both plates that absorption of the guided light by the metal plates is minimal. To achieve efficient modulation (so that smaller values of applied field are needed), it is preferable to thin the substrate, by some means such as etching or lapping and polishing. Note that for a TEM RF waveguide 425, the optical mode is preferably spaced approximately the same distance from both electrode plates. On the other hand, for a microstrip transmission-line RF waveguide, the optical mode is preferably located closer to the narrower electrode of that RF waveguide.

Any optoelectronic intensity modulator having a physical length sufficiently short to fit within the width of the RF waveguide 425 and being based on changes in the optical refractive index can be used for the modulator 420 of this disclosure. Intensity modulators based on changes in the refractive index include distributed-feedback grating modulators and Fabry-Perot cavity modulators. An electro-absorption modulator also can be used for the modulator of this invention. All of these modulators have optimal performance over a limited range of optical wavelengths. Also, when the light in different ones of the parallel channels of the RF photonic link comprises different wavelengths, their modulators may need to have somewhat different designs. These different designs may involve gratings of different period, waveguides of different optical-mode index, Fabry Perot resonators of different cavity length, and electro-absorbing material with optical absorption spectra whose absorption edge coincide with different wavelengths. One embodiment of a Fabry-Perot cavity modulator has cavity reflectors constructed from gratings (that act as distributed Bragg reflectors). This embodiment is especially compatible with a micro-strip transmission line RF waveguide wherein the metal top electrode of the micro-strip transmission line can be designed to overlap the central portion of the modulator but to not overlap the grating regions at the two ends of the modulator.

The RF waveguide 425 can be completely filled with the substrate material of the optoelectronic modulator 420. However, the waveguide's dielectric filler material also could comprise some other material that has preferably approximately the same RF dielectric constant as that of the substrate of the modulators 420. This constraint reduces the reflection of the propagating EM field at the various material interfaces that may be formed at the slices.

Figure 6:
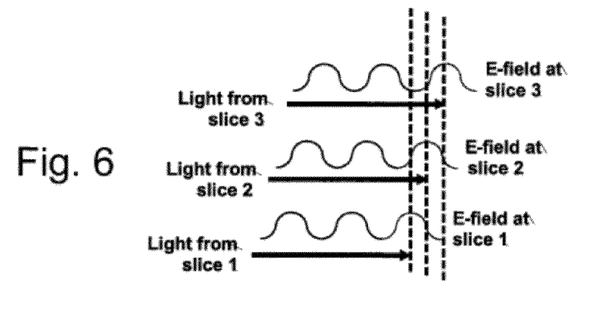
FIG. 6 is an illustration of time delay relationships for RF waveforms arriving at successive optoelectronic modulators in the RF waveguide of FIGS. 4*a* and 4*b* as well as their relationship to the light arriving at the photodetector from those same optoelectronic modulators.

The EM field propagating in the RF waveguide 425 produces a time-varying electric field at a given 426 slice in that waveguide. This time-varying electric field can be considered the RF modulating signal waveform for the optoelectronic modulator of that slice. Different slices generally will experience a modulating signal waveform that is shifted in time relative to the waveforms experienced by the other slices. The slice located closest to the input end of the RF waveguide will experience the waveform most advanced in time and the slice located farthest from the input end of the RF waveguide will experience a time-delayed version of that waveform, as illustrated in FIG. 6. The modulated light from the multiple modulators 420 that reaches the common photodetector 450 at some instant in time preferably is modulated by the same time-instant of the RF modulating signal waveform 429. Since at any given instant, different modulators 420 are modulated by different time-wise portions of the modulating signal waveform 429, the optical waveguides or optical fibers 435 that connect those modulators to the photodetector preferably have different lengths to provide an optical domain delay of the modulated light that compensate for the time-delay of the modulating signal waveform, as illustrated in FIG. 4*a*. Thus, the light from the modulator located in the slice farthest from the RF waveguide's input end will have the smallest time delay impressed by the optical waveguide or optical fiber before that light reaches the photodetector. In this way, the modulated light from the multiple parallel-connected optoelectronic modulators are time synchronized. In FIG. 6 the light from each slice is summed to that the lights from each slice are time-coincident—the rightmost of the three dotted lines showing the modulated light to be summed from the third slice, the middle one of the three dotted lines showing the modulated light to be summed from the second slice and the leftmost of the three dotted lines showing the modulated light to be summed from the first slice.

FIG. 6 illustrates the time delay relationship for RF waveforms arriving at successive optoelectronic modulators 420 in the RF waveguide 425 as well as their relationship to the various optical-wavelength components of the optical waveform arriving at the photodetector 450 from the various optoelectronic modulators 420. The references to slices in FIG. 6 are references to the RF waveguide slices 426 forming the modulators 420 in the RF waveguide 425.

Figure 7:
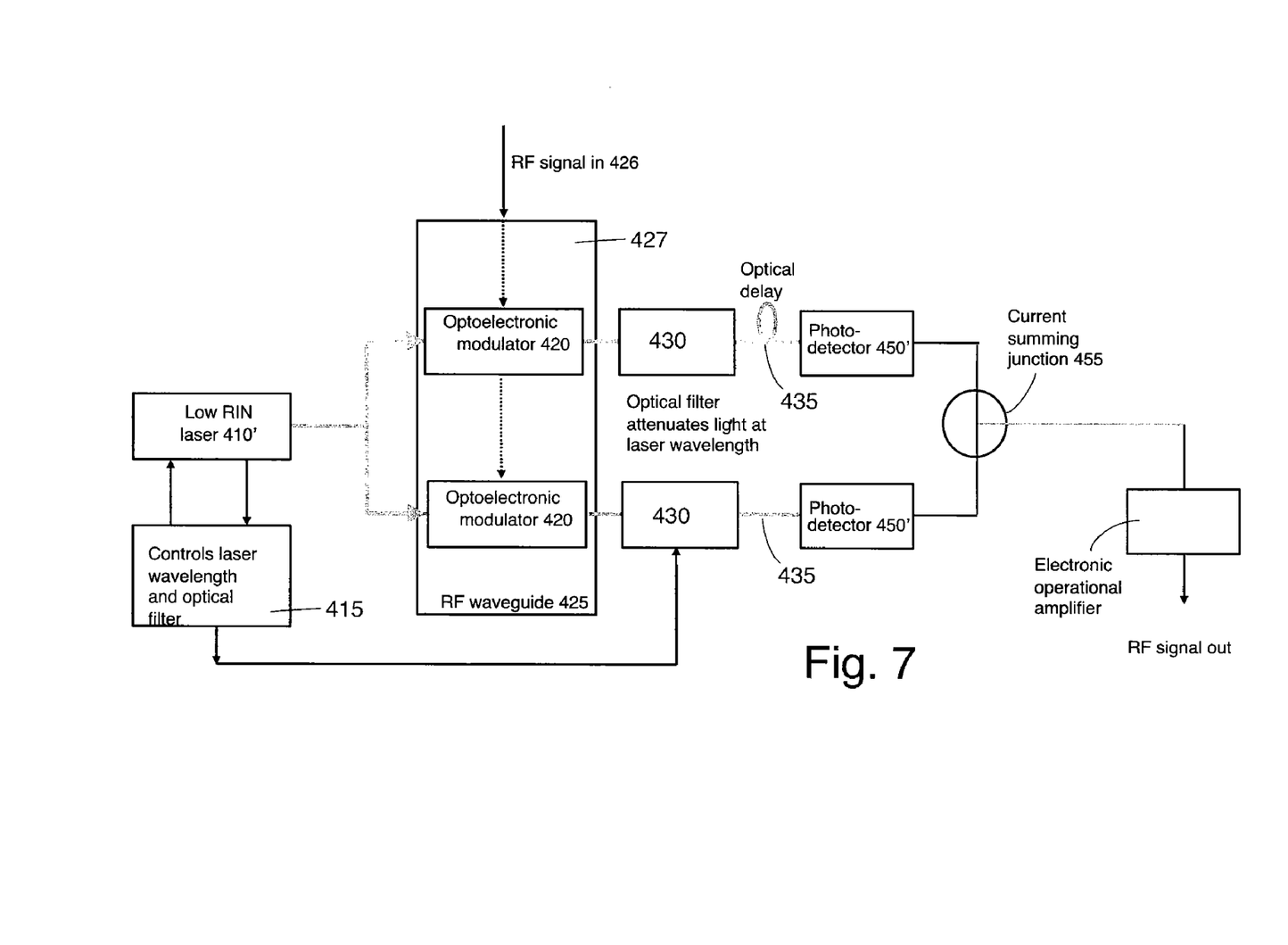
FIG. 7 is a block diagram of RF photonic link comprising a single laser source and multiple optoelectronic modulators and multiple photodetectors in accordance with the present invention.

FIG. 7 illustrates an RF photonic link of this invention that comprises multiple optoelectronic modulators 420 and multiple photodetectors 450'. The multiple modulators 420 can have the light in them supplied by a common light source 410' (as shown in the FIG. 7), but preferably the light supplied to the modulators 420 should be supplied by different light sources 410 as shown for the embodiment of FIG. 8. In the latter case, the light supplied to different ones of the modulators 420 by different light sources could have the same wavelength or could have differing wavelengths. Each modulator 420 is optically connected to a different photodetector 450' and supplies modulated light to that photodetector 450' in this embodiment. Again, only two modulators (and in this case two photodetectors 450') are depicted, but in principal, typical embodiments may have a large number of modulators 420 (and in this case an equal number of associated photodetectors 450'). The electrical outputs of the photodetectors 450' are then combined together. In some embodiments, the output currents from the multiple photodetectors can be combined together at the current-summing input 455 of an electronic amplifier 460 (as shown in FIG. 7). This technique of combining currents is described in prior U.S. Pat. No. 6,724,523. The multiple optoelectronic modulators 420 are located within a common RF waveguide 425. The RF waveguide 425 can be a dielectric-filled transverse electromagnetic (TEM) waveguide that has a pair of metal plate electrodes that sandwich a dielectric material, such as illustrated in FIGS. 5*a* and 5*b*. The RF waveguide 425 also can assume other forms, such as a dielectric waveguide (with no metal electrodes). Like the embodiment of FIG. 4*a*, the EM field propagating in the RF waveguide produces a time-varying electric field at a given slice 426 in that waveguide 425. Thus, the optoelectronic modulator 420 located in that slice 426 modulates the light propagating in that modulator 420 according to the value and sign of this electric field, which is considered the RF modulating signal waveform.

Figure 8:
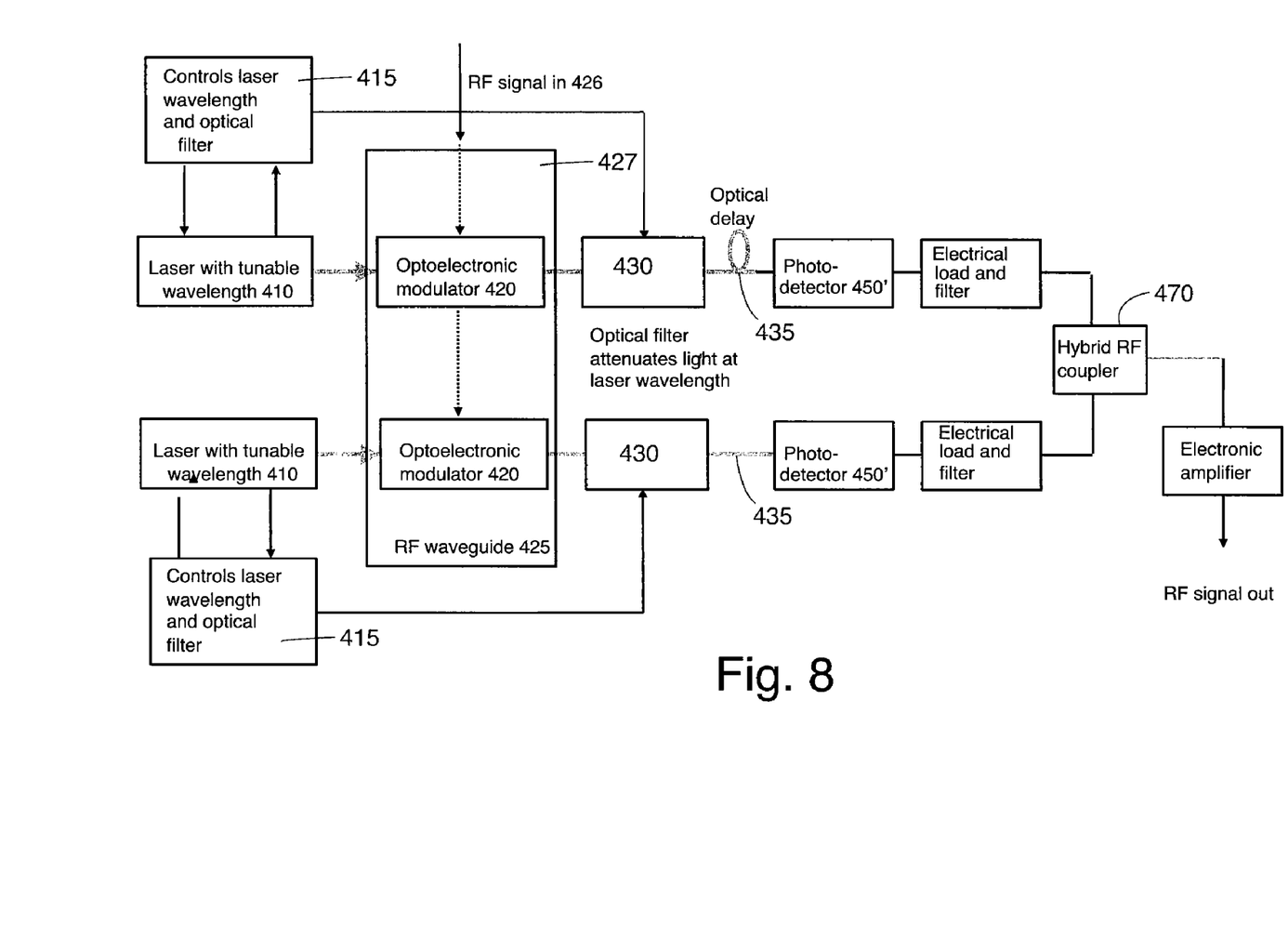
FIG. 8 is a block diagram of RF photonic link comprising multiple laser sources and multiple optoelectronic modulators and multiple photodetectors in accordance with the present invention.

FIG. 8 is a block diagram of an embodiment of an RF photonic link comprising multiple laser sources 410, multiple optoelectronic modulators 420 and multiple photodetectors 450'. The outputs of the multiple photodetectors 450' are combined by a hybrid RF coupler 470. Although multiple light sources are shown in the figure, the light coupled into the multiple optoelectronic modulators 420 also could be supplied from the same light source 410' (as shown for the embodiment of FIG. 7). The light sources 410 or 410' are preferably supplied by a laser with a low relative intensity noise (RIN) to reduce the noise in the photodetector outputs and thereby improve the signal-to-noise ratio of the link.

Some or all of the phase shift desired for the various inputs to the hybrid coupler can be produced as a result of the time-delay of the RF modulating signal waveforms at the various slices. The rest of that desired phase shift can be obtained by optical-domain time delays of the modulated light carried by the optical waveguides or optical fibers connecting the modulators to the photodetectors. A portion of the desired phase shift also could be obtained by electrical-domain time delays of the electrical output signals from the photodetectors.

Figure 9:
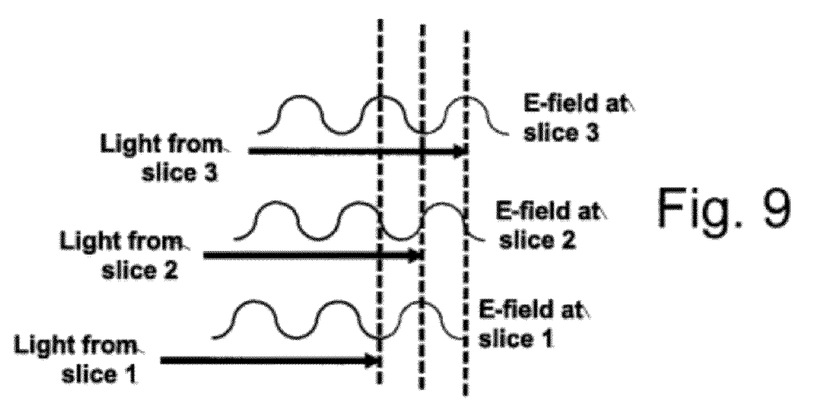
FIG. 9 is an illustration of time-delay relationships for RF waveforms arriving at successive optoelectronic modulators in the RF waveguide of FIG. 8 as well as the time-delay relationship between the modulated light reaching the photodetectors associated with these modulators.

A hybrid coupler 470 is desirable because it can combine the RF energy from different inputs with less insertion loss compared with that of non-phase-sensitive RF couplers or power combiners. The various inputs to the hybrid RF coupler 470 have a fixed relative phase shift, with typical phase shifts being 90°, 180°, and 270°. FIG. 9 illustrates the time-delay relationship for RF waveforms arriving at successive optoelectronic modulators in the RF waveguide as well as the time-delay relationship between the modulated light reaching the photodetectors associated with these modulators. As illustrated, the phase shifts of 90° and 180° are provided by appropriately locating the slices 426 containing the modulators 420. For the example illustrated, the modulated light from all of the various modulators 420 would be given the same optical-domain time delay. Also, the photodetector outputs would be given the same electrical-domain time delay. In FIG. 6 the light from each slice is summed to that the lights from each slice are time-coincident—the rightmost of the three dotted lines showing the modulated light to be summed from the third slice, the middle one of the three dotted lines showing the modulated light to be summed from the second slice and the leftmost of the three dotted lines showing the modulated light to be summed from the first slice.

It should be understood that the above-described embodiments are merely some possible examples of implementations of the presently disclosed technology, set forth for a clearer understanding of the principles of this disclosure. Many variations and modifications may be made to the above-described embodiments of the invention without departing substantially from the principles of the invention. All such modifications and variations are intended to be included herein within the scope of this disclosure and the present invention and protected by the following claims.

What is claimed is:
1. An RF photonic link comprising:
 a. at least one light source,
 b. multiple optoelectronic modulators, and
 c. an RF waveguide common to each one of said multiple optoelectronic modulators;

d. wherein the multiple optoelectronic modulators are optically arranged in parallel to receive light from said at least one light source and are disposed in said RF waveguide; and e. wherein the RF waveguide, in use, guides an RF electromagnetic field successively to each of the multiple optoelectronic modulators disposed therein, the RF electromagnetic field propagating through the RF waveguide in a direction that is perpendicular to a direction in which an optical field propagates through each of said optoelectronic modulators.

2. An RF photonic link according to claim 1 wherein said at least one light source comprises multiple light sources with each light source of said multiple light sources emitting, in use, a different optical wavelength carrier and with each light source of said multiple light sources being associated with a different one of the multiple optoelectronic modulators.

3. An RF photonic link according to claim 1 wherein at least one photodetector is coupled to receive light from said multiple optoelectronic modulators.

4. An RF photonic link according to claim 3 wherein said at least one photodetector comprises multiple photodetectors with each photodetector of said multiple photodetectors receiving light associated with a different one of the multiple optoelectronic modulators.

5. An RF photonic link according to claim 4 wherein current outputs of said multiple photodetectors are summed at a current summing junction.

6. An RF photonic link according to claim 4 wherein current outputs of said multiple photodetectors are each applied to a different electrical load and wherein load voltages provided by the multiple photodetectors are summed at a hybrid RF coupler.

7. An RF photonic link according to claim 1 further including at least one photodetector responsive to at least one of said multiple optoelectronic modulators.

8. An RF photonic link according to claim 7 wherein said at least one photodetector comprises multiple photodetectors with each photodetector of said multiple photodetectors receiving light associated with a different one of the multiple optoelectronic modulators.

9. An RF photonic link according to claim 8 wherein said RF electromagnetic field propagating through the RF waveguides modulates, in succession, said optical field propagating through each of said optoelectronic modulators to form a modulated optical field from each of said optoelectronic modulators.

10. An RF photonic link according to claim 7 further including an optical delay element located between one of said optoelectronic modulators and said at least one photodetector.

11. An RF photonic link according to claim 10 wherein said at least one photodetector comprises multiple photodetectors with each photodetector of said multiple photodetectors receiving light associated with a different one of the multiple optoelectronic modulators.

12. A method of forming an RF photonic link comprising:
a. providing at least one light source,
b. providing multiple optoelectronic modulators, and
c. providing an RF waveguide common to each one of said multiple optoelectronic modulators;
d. disposing the multiple optoelectronic modulators in said RF waveguide such that optical axes of each multiple optoelectronic modulator are arranged in parallel to receive light from said at least one light source; and
e. the RF waveguide, in use, supplying an RF electromagnetic field to each of the multiple optoelectronic modulators disposed therein, the RF electromagnetic field propagating through the RF waveguide in a direction that is perpendicular to a direction in which an optical field propagates through each of said optoelectronic modulators.

13. A method of forming an RF photonic link according to claim 12 wherein said at least one light source comprises multiple light sources with each light source of said multiple light sources emitting a different optical wavelength carrier and with each light source of said multiple light sources being associated with a different one of the multiple optoelectronic modulators.

14. A method of forming an RF photonic link according to claim 13 wherein said at least one photodetector comprises multiple photodetectors with each photodetector of said multiple photodetectors receiving light associated with a different one of the multiple optoelectronic modulators.

15. A method of forming an RF photonic link according to claim 12 further including providing multiple photodetectors with each photodetector of said multiple photodetectors receiving light associated with a different one of the multiple optoelectronic modulators.

16. A method of forming an RF photonic link according to claim 15 further including summing current outputs of said multiple photodetectors at a current summing junction.

17. A method of forming an RF photonic link according to claim 15 further including applying current outputs of each of said multiple photodetectors to a different electrical load and summing load voltages generated by the different electrical loads at a hybrid RF coupler.

18. An RF photonic link according to claim 17 further including providing a delay to the modulated optical field from one of said optoelectronic modulators and providing a different delay to the modulated optical field from another one of said optoelectronic modulators.

19. A method of forming an RF photonic link according to claim 15 further including providing a delay to a modulated optical field from one of said optoelectronic modulators and providing a different delay to a modulated optical field from another one of said optoelectronic modulators.

20. A method of forming an RF photonic link according to claim 12 wherein said RF electromagnetic field propagating through the RF waveguides modulates, in succession, said optical field propagating through each of said optoelectronic modulators to form a modulated optical field from each of said optoelectronic modulators.

21. A method of forming an RF photonic link according to claim 20 further including providing a delay to the modulated optical field from one of said optoelectronic modulators and providing a different delay to the modulated optical field from another one of said optoelectronic modulators.

22. A method of forming an RF photonic link according to claim 12 further including summing current outputs of said multiple photodetectors at a current summing junction.

23. A method of forming an RF photonic link according to claim 12 further including applying current outputs of each of said multiple photodetectors to a different electrical load and summing load voltages generated by the different electrical loads at a hybrid RF coupler.

24. A method of forming an RF photonic link according to claim 12 further including providing a delay to a modulated optical field from one of said optoelectronic modulators and providing a different delay to a modulated optical field from another one of said optoelectronic modulators.

25. An RF photonic link comprising:
a. at least one light source,
b. at least one photodetector,
c. multiple optoelectronic modulators each having an output coupled to said at least one photodetector, and d. an RF waveguide common to each one of said multiple optoelectronic modulators;
e. means for disposing the multiple optoelectronic modulators in said RF waveguide such that optical axes of each multiple optoelectronic modulator are arranged in parallel to receive light from said at least one light source; and
f. the RF waveguide providing means for supplying an RF electromagnetic field to each of the multiple optoelectronic modulators disposed therein, the RF electromagnetic field propagating through the RF waveguide in a direction that is perpendicular to a direction in which an optical field propagates through each of said optoelectronic modulators.

26. An RF photonic link according to claim 25 wherein said at least one light source comprises multiple light sources with each light source of said multiple light sources emitting a different optical wavelength carrier and with each light source of said multiple light sources being associated with a different one of the multiple optoelectronic modulators.

27. An RF photonic link according to claim 25 wherein said at least one photodetector comprises multiple photodetectors with each photodetector of said multiple photodetectors receiving light associated with a different one of the multiple optoelectronic modulators.

\* \* \* \* \*